United States Patent

Sohn et al.

Patent Number: 5,812,550
Date of Patent: Sep. 22, 1998

[54] ASYNCHRONOUS TRANSFER MODE (ATM) LAYER FUNCTION PROCESSING APPARATUS WITH AN ENLARGED STRUCTURE

[75] Inventors: Sung Won Sohn; Yoon Mi Doh; Jong Oh Kim, all of Yuseong-Ku, Rep. of Korea

[73] Assignees: Electronics and Telecommunications Research Institute, Daejeon; Korea Telecommunication Authority, Seoul, both of Rep. of Korea

[21] Appl. No.: 761,498

[22] Filed: Dec. 6, 1996

[30] Foreign Application Priority Data

Dec. 23, 1995 [KR] Rep. of Korea .................. 1995-55869

[51] Int. Cl.$^6$ ....................................................... H04J 1/14
[52] U.S. Cl. ........................................... 370/395; 370/469
[58] Field of Search ...................................... 370/395, 396, 370/397, 398, 399, 412, 413, 414, 415, 416, 417, 418, 419, 420, 465, 466, 467, 469, 474

[56] References Cited

U.S. PATENT DOCUMENTS 5,418,786  5/1995  Loyer et al. .

OTHER PUBLICATIONS

A New ATM Multiplexer With Dynamic Scheduling; Wen-Tsuen Chen, Nen-Fu Huang, Pi-Rong Sheu and Yaw-Ren Chang; 1991; pp. 136–139.

Performance analysis of a dynamic priority scheduling method in ATM networks; T.-Y. Huang and J.-L.C. WU; 1993; pp. 285–290.

The ATM Layer Chip; An ASIC for B–ISDN Applications; Cesar A. Johnston and H. Jonathan Chao; 1001; pp. 741–750.

*Primary Examiner*—Wellington Chin
*Assistant Examiner*—Huy D. Vu
*Attorney, Agent, or Firm*—Antonelli, Terry, Stout & Kraus, LLP

[57] ABSTRACT

An asynchronous transfer mode (ATM) layer function processing apparatus with an enlarged structure is disclosed including: an ATM layer receiving cell processor for storing a cell start signal and cell input data extracted by use of a cell read clock in a buffer when a cell transmissible signal is received from an input signal of a subscriber physical layer function processor, extracting a flag according to the number of stored cells, and performing a multiplexing operation according to a scheduling algorithm using a cell interrupt signal and the extracted flag; a processor interface for forming a cell from data received from a microprocessor, storing the cell in a buffer, generating the cell interrupt signal, and controlling each constituent of the ATM layer function processing apparatus; an ATM layer transmitting cell processor for performing an input cell routing function according to an output port identifier value when a corresponding routing value and a match signal are generated from a connection table, and performing output cell routing, broadcasting and selective broadcasting functions according to the field allocation of an appropriate output port identifier value; and a function mode processor for independently connecting the ATM layer receiving and transmitting cell processors to network and subscriber physical layer function processors connected to each physical link according to a control signal of the processor interface.

7 Claims, 11 Drawing Sheets

ASYNCHRONOUS TRANSFER MODE (ATM) LAYER FUNCTION PROCESSING APPARATUS WITH AN ENLARGED STRUCTURE

BACKGROUND OF THE INVENTION

The present invention relates to asynchronous transfer mode (ATM) layer function processing apparatuses for processing an ATM protocol by the unit of an ATM cell, and more particularly to an ATM layer function processing apparatus which is designed to be able to enlarge a function and a structure by a physical connection according to a position and a function attained scale of a used system.

Nowadays, the development of technology in the field of a communication network makes it possible to introduce a B-ISDN (broadband integrated services digital network) which can provide various services demanding a wide bandwidth such as CATV (common antenna television), HDTV (high definition television), etc. by a single interface, as well as an incorporated service using a telephone, data, etc. Since the B-ISDN uses an ATM to transmit information, real-time information transmission, and narrow band and broad band high-speed services using a packet can be supported.

All information of the B-ISDN is transmitted through a virtual connection of virtual path/virtual channel as a form of a packeted cell which is the basic unit of information. An ATM cell has an ATM header consisting of general flow control (GFC), virtual path identifier (VPI)/virtual channel identifier (VCI), payload type identifier (PTI) and cell loss priority (CLP) fields, and has a protocol data unit (PDU) which is information of a upper layer, that is, a payload.

An ATM protocol for supporting the B-ISDN transmits and receives service data by the unit of the virtual path/virtual channel, and in such data transmission, it is particularly important to process the VPI/VCI for distinguishing the virtual path/virtual channel. In order to provide service quality and a flexible bandwidth demanded by the user, a B-ISDN network unit searches for information related to the virtual connection from header information of a user information cell. In particular, a function for introducing necessary information from an input cell according to the virtual path/virtual channel and processing the ATM protocol using this information is a unique function of an ATM layer which is prescribed according to recommendations related to ITU-T.

Under the circumstances of the B-ISDN, there is demanded a multiplexing technique suitable to an ATM system which is quite different from a time division multiplexing (TDM) system based on a conventional STM (synchronous transfer mode). The multiplexing of the ATM system is based on a statistical system in order to flexibly process a traffic having a burst characteristic as well as a continuous characteristic.

Since a conventional ATM multiplexing system continues to generate an empty slot, a line adjacent to a processing node occupies many slots. Therefore, there are problems in equality of cell transmission, and it is not easy to achieve the ATM multiplexing system due to a switch structure.

In a preferred embodiment of the present invention, the loss of a cell is lowered and simultaneously the first priority is given to a signal and maintenance cell. The cell is multiplexed and transmitted according to the priority, and a port identifier is inserted to the cell transmitted from each input port. Therefore, if the multiplexing is firstly performed, the signal and maintenance cell transmitted different ports is distinguished.

Meanwhile, in order to implement VPI/VCI conversion for the cell with a variety of connection information, cell routing, a function for distinguishing F4 and F5 OAM (operation and management) cells, a loopback function, traffic monitoring, etc., the connection information contained in the header of the input cell out of various connection information should be detected. Further, information about connection, such as an output port identifier for the cell routing, the VPI/VCI for conversion, and traffic information for processing a traffic, should be simultaneously managed. To manage such connection information, whether an input virtual path/virtual channel exists in a connection table is checked by using a RAM as the connection table, and a necessary output value is searched. When storing an input value in the connection table, an easy search method should be used to minimize a search time.

A proposed method for storing and searching the input value uses a linked list and a software algorithm. As one example, there are establishment and access of a database, mapping of an output address versus an input address in a router, a router function at a switch, etc. However, since the connection table in which the connection information is stored in an ATM network should be searched within one cell time for an arrival cell, a high-speed search function is needed, and connection control for recording or erasing a connection should have not effect on a cell flow. Therefore, in the conventional method for storing and searching the input value, it is difficult to manage the connection information by real time. In the preferred embodiment of the present invention, a content addressable memory (CAM) which is capable of searching the connection information within one cell time is used as the connection table to record or erase the connection related information of a 24-bit length transmitted as a form of the VPI/VCI within a cell header of a 53-octet (53-byte) length. Therefore, the search time is minimized by searching data during one cycle irrespective of the number of stored entries. Moreover, the header is processed by real time without losing a received cell using the CAM so as to search features and additional information for the ATM header. In this case, a cell which does not correspond to a provided service is discarded. For a cell corresponding to the provided service, the VPI/VCI conversion is performed, and an OAM cell, a signal cell or a user cell is distinguished to be routed to a corresponding port.

SUMMARY OF THE INVENTION

It is an object of the present invention to provide an ATM layer function processing apparatus which provides a protocol processing function such as standard connection between an ATM layer and a physical layer, as well as a function for multiplexing an ATM cell for a virtual channel and a virtual path according to an input state, table management for connection information, ATM connection setting/release, cell routing, a function for distinguishing F4 and F5 OAM cells of the ATM layer, a loopback function, traffic monitoring which are provided irrespective of a position of a network unit in functions of the ATM layer based on an ATM protocol standard model.

An ATM layer function processing apparatus with an enlarged structure embodying the present invention includes: an ATM layer receiving cell processor for storing a cell start signal and cell input data extracted by use of a cell read clock in a buffer when a cell transmissible signal is received from an input signal of a subscriber physical layer function processor, extracting a flag according to the number of stored cells, and performing a multiplexing operation according to a scheduling algorithm using a cell interrupt signal and the extracted flag; a processor interface for forming a cell from data received from a microprocessor, storing the cell in a buffer, generating the cell interrupt signal, and controlling each constituent of the ATM layer function processing apparatus; an ATM layer transmitting cell processor for performing an input cell routing function according to an output port identifier value when a corresponding routing value and a match signal are generated from a connection table, and performing output cell routing, broadcasting and selective broadcasting functions according to the field allocation of an appropriate output port identifier value; and a function mode processor for independently connecting the ATM layer receiving and transmitting cell processors to network and subscriber physical layer function processors connected to each physical link according to a control signal of the processor interface.

In one of features of the present invention, the ATM layer function processing apparatus performs a moduled 1×8 multiplexing/demultiplexing function and a routing function which can be commonly used in any systems of a B-ISDN. It is possible to edit, enlarge and improve an ATM layer management function which varies with international or domestic standardization through a moduled design concept, thereby preventing the variation of an overall system. A basic cell concept is introduced to be used as a switching element by simple cascading of the ATM layer function processing apparatus.

The ATM layer function processing apparatus with an enlarged structure provides the following functions. That is, if there is a service request in order to provide a path of an ATM cell for ATM upper layer service, connection related information is determined by negotiation between call control and signal entity. An ATM layer management entity transmits a control instruction to the ATM layer function processing apparatus, and the ATM layer function processing apparatus sets and releases an ATM connection by writing information in a connection table (although various methods are used as the connection table of an ATM, a LAN CAM is used in a preferred embodiment of the present invention) according to the control instruction. Through such a process, the ATM connection between peer-to-peer and link-by-link is set, and corresponding service information between a upper layer, an ATM layer and a physical layer is transmitted and received.

A cell arriving at the ATM layer function processing apparatus from physical layers (of a maximum of 8 lines) is effectively multiplexed, and the received cell is stored in a cell buffer in order to improve the efficiency of multiplexing and the performance of cell processing. The order of multiplexing is determined according to a FCFS (first come first service) principle and fairness in cells of the same priority by using resources such as the capacity of the buffer, the number of cells stored in the buffer, presence/absence of a cell buffer overflow, priority between virtual connections, presence/absence of OAM and signal cells, etc. Thus a corresponding cell is connected to an output port.

Demultiplexing and routing functions are provided for a multiplexed ATM cell. A header is extracted from a first incoming cell and a CAM is looked up using VPI/VCI information contained in header information. If a corresponding routing value is generated from the CAM, a cell which does not set a connection is discarded, and a cell which sets a connection is generated through a corresponding line according to the routing value, thereby providing the demultiplexing function. The demultiplexing function supports a routing operation for a point-to-point connection, in addition to broadcasting and distribution service, multicasting connection and a point-to-multipoint connection.

If a VPI/VCI value for a network connection is different from that for a subscriber connection in the same virtual channel, there is needed a VPI/VCI conversion function for converting these two VPI/VCI values in an ATM cell provided through this virtual channel. This conversion function is performed by retrieving a conversion value in a process of looking up the CAM in the demultiplexing operation.

The ATM layer function processing apparatus is used in an access network unit constituting a broadband access network to execute multiplexing and concentrating functions. If an ATM layer receiving cell processor is separately used from an ATM layer transmitting cell processor, the ATM layer function processing apparatus is designed to be used in a B-ISDN connection card of a broadband terminal. Since there is provided a structure of a moduled form according to a function, even if functions are added according to future recommendations, and other requirements are demanded, the ATM layer function processing apparatus may be easily applied thereto. Furthermore, since an exchange function is provided only by a physical serial connection, the ATM layer function processing apparatus may be used in a service exchange construction for accommodating the future service including a basic ATM layer protocol processing function.

BRIEF DESCRIPTION OF THE ATTACHED DRAWINGS

DETAILED DESCRIPTION OF PREFERRED EMBODIMENT

Figure 1:
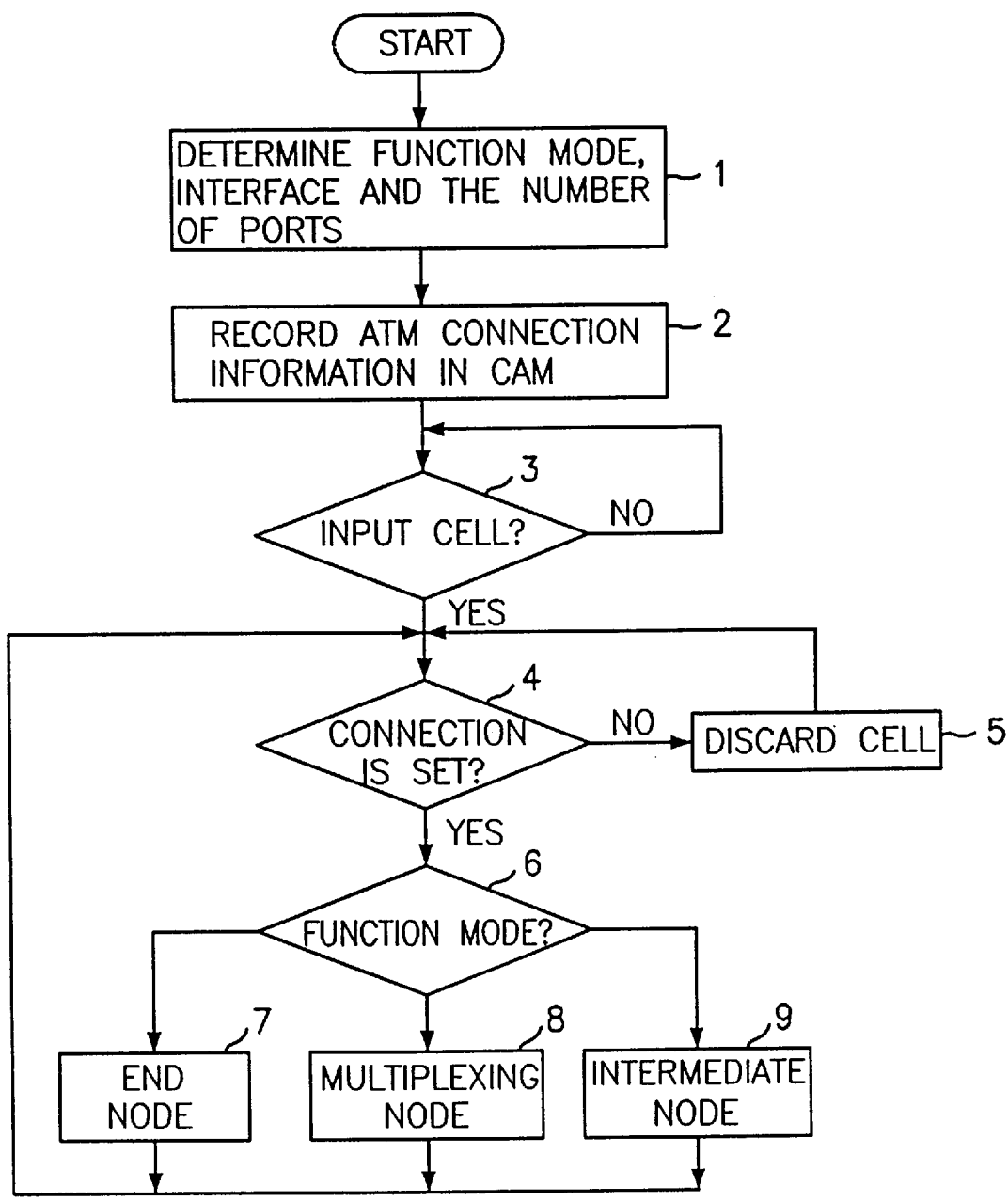
FIG. 1 is a flow chart illustrating a schematic operation of an ATM layer function processing apparatus according to the present invention.

FIG. 1 is a schematic flow chart of an operation of an ATM layer function processing apparatus. Resources such as a buffer, a register, a CAM. etc. are initialized. An operating mode is determined to a suitable function mode for a designed system by setting an end node mode, an intermediate node mode or a multiplexing node mode. The number of ports (a maximum of 8) required for a connection between a physical layer and a upper layer, and an interface system (RECEIVE READY system, UTOPIA interface system proposed in ATM Forum, or PMC interface system proposed by PMC Sierra Co.) are determined (step 1).

ATM connection information provided by a virtual path/virtual channel (or corresponding virtual channel/virtual path when there is a connection set by a signal function) predetermined as a permanent channel is recorded in an ATM CAM (step 2). Whether there is an input cell is checked (step 3). If an ATM cell is received by a cell synchronizing signal and a cell effective signal, whether a connection identifier VPI/VCI corresponding to the ATM cell is confirmed (step 4). If there is no a corresponding connection, the cell is discarded (step 5). If there is a corresponding connection, a protocol processing at a corresponding mode is performed according to a function mode (steps 6 to 9).

Figure 2:
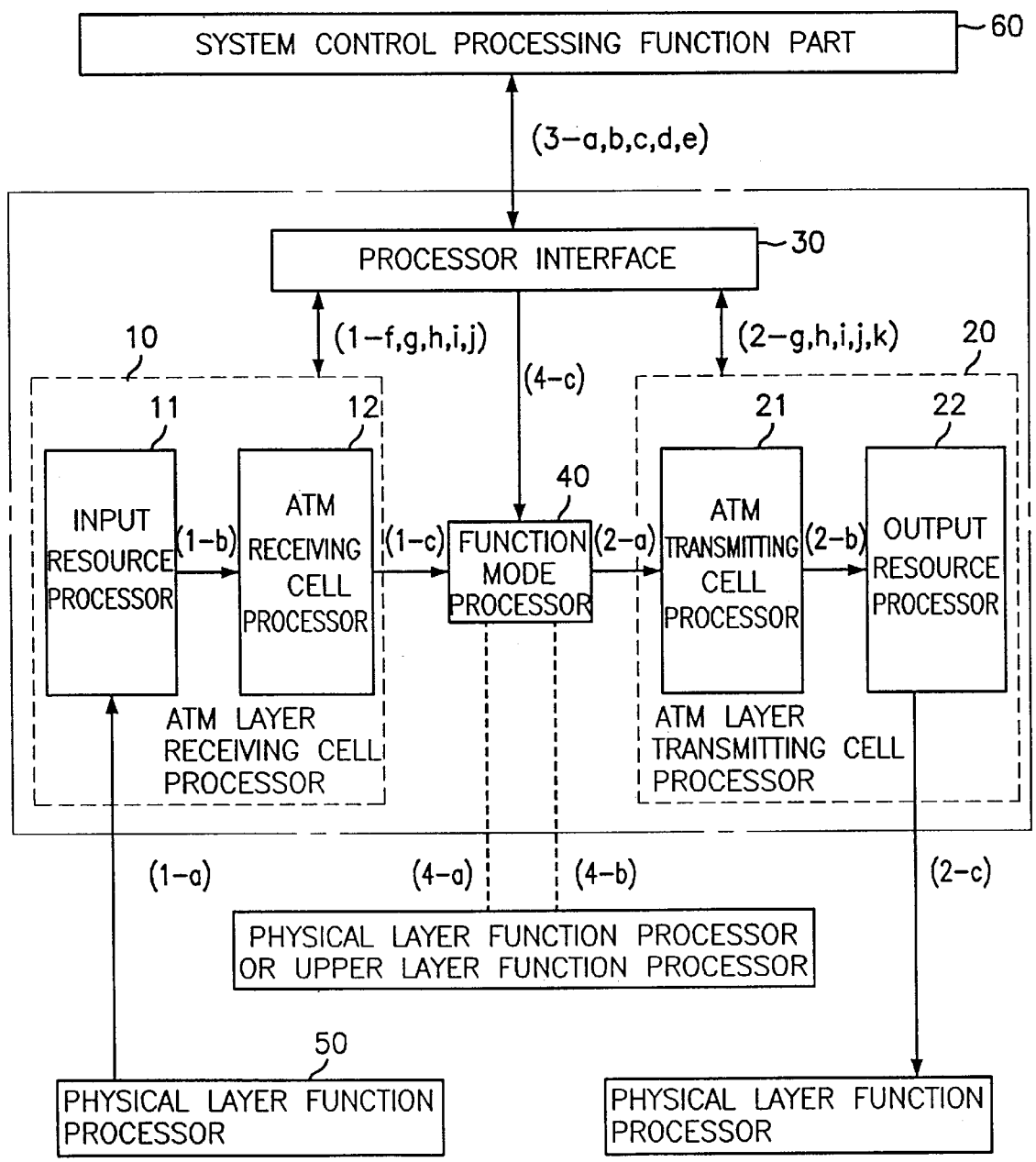
FIG. 2 is a block diagram illustrating an ATM layer function processing apparatus according to the present invention.

FIG. 2 shows the ATM layer function processing apparatus. A reference numeral 10 designates an ATM layer receiving cell processor, 20 an ATM layer transmitting cell processor, 30 a processor interface, 40 a function mode processor, 50 a physical layer function processor, and 60 a system control processing function part.

The ATM layer function processing apparatus has 4 function processing parts including the ATM layer receiving and transmitting cell processors 10 and 20 which are in charge of multiplexing/demultiplexing and ATM layer protocol functions, the processor interface 30 for supporting the ATM layer receiving and transmitting cell processors 10 and 20 and interfacing them with the system control processing function part 60, and the function mode processor 40 for providing an interface function according to a function mode so as to use the ATM layer receiving and transmitting cell processors 10 and 20 independently or continuously.

Figure 3A:
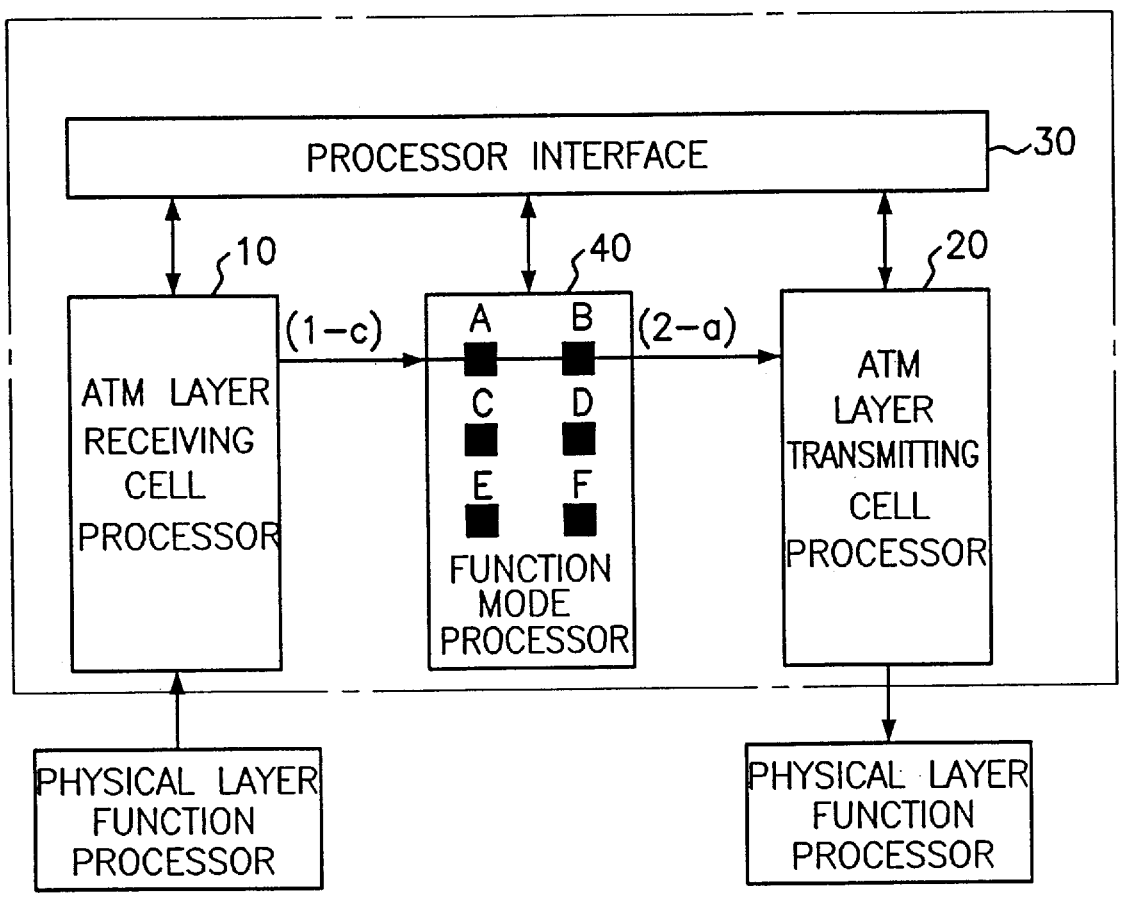
FIGS. 3A, 3B and 3C illustrate interface states according to a functional mode of the ATM layer function processing apparatus of FIG. 2.
Figure 3B:
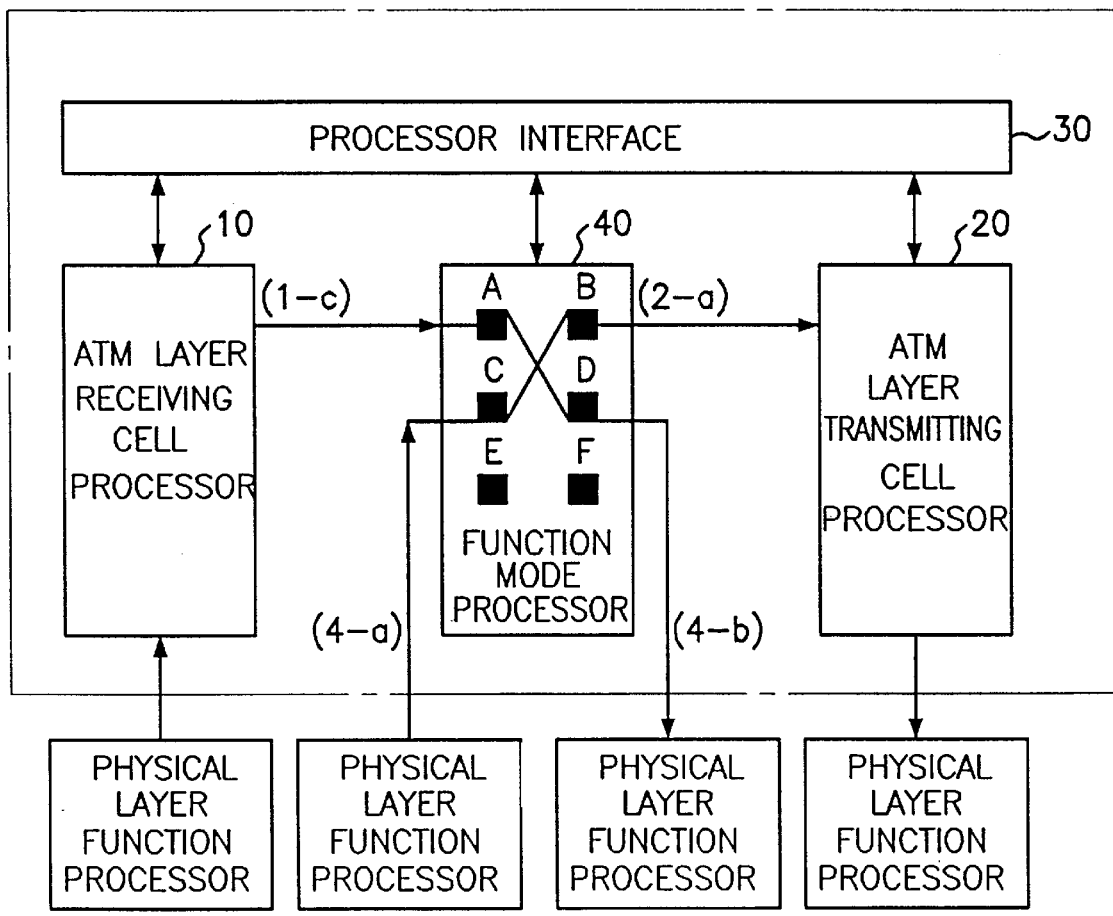
Figure 3C:
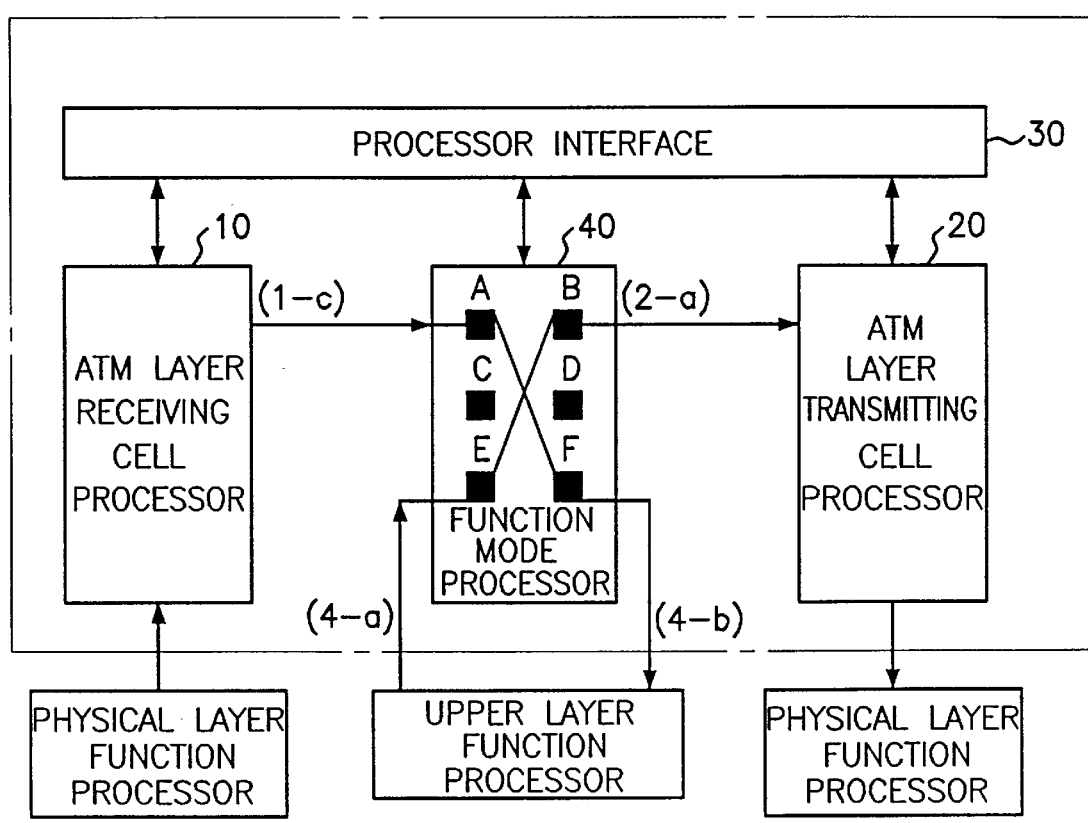

The ATM layer function processing apparatus operates as three functional modes as shown in FIGS. 3A, 3B and 3C. If the ATM layer function processing apparatus is used in a broadband network terminator (B-NT), an access node (AN), etc. corresponding to an intermediate mode of a B-ISDN to provide a protocol processing function and a routing function of an ATM layer, the function mode processor 40 is set to an intermediate node mode in which the ATM layer receiving cell processor 10 is linked with the ATM layer transmitting cell processor 20. If the ATM layer function processing apparatus is used in a multiplexer, a concentrator, etc. to provide a multiplexing/demultiplexing operation and a concentrating function, the function mode processor 40 is set to a multiplexing node mode in which the ATM layer receiving and transmitting cell processors 10 and 20 are independently connected to the physical layer function processor 50. If the ATM layer function processing apparatus is used in a broadband terminal adaptor (B-TA), broadband terminal equipment (B-TE), etc. corresponding to subscriber terminating systems of the B-ISDN to provide an ATM layer function for accessing a network in an ATM layer protocol, the function mode processor 40 is set to an end system mode in which the ATM layer receiving and transmitting cell processors 10 and 20 are independently connected to a upper layer function processor.

The ATM layer receiving cell processor 10 connected to the physical layer function processor 50 of a maximum of 8 ports multiplexes information received from the physical layer function processor 50 and transmits the multiplexed information to the function mode processor 40. The ATM layer receiving cell processor 10 is broadly divided into an input resource processor 11 and an ATM receiving cell processor 12. The input resource processor 11 is in charge of an interface with the physical layer function processor 50, and provides a function for ensuring access capability according to the size of a buffer demanded for an interface, adaptation to an operating speed of the physical layer function processor 50 and adaptability to an interface system (in a preferred embodiment of the present invention, the input resource processor 11 selectively supports the RECEIVE TEADY system, and UTOPIA interface system proposed in ATM Forum) with the physical layer function processor 50. That is, the input resource processor 11 receives a cell synchronized with an input interface signal 1-$a$ according to the interface system by the unit of 53 bytes, stores the received interface signal in an internal buffer (one FIFO per line) which is separated according to each input port, and reports the number of cells stored in the buffer and the status of the buffer to the processor interface 30 at any time.

The ATM receiving cell processor 12 multiplexes the cell of service information received through a maximum of 8 ports of the physical layer function processor 50 according to status information of the buffer, priority information and a scheduling algorithm received from the input resource processor 11 and the processor interface 30, and transmits the multiplexed cell to the function mode processor 40 in order.

The ATM layer transmitting cell processor 20 which is in charge of a demultiplexing operation extracts header information for an ATM cell received from the function mode processor 40, extracts information about routing port number, a converted VPI/VCI value, connection setting, and multicasting through a CAM retrieving operation using the header information, and transmits the input cell to the physical layer function processor 50.

The ATM layer receiving cell processor 20 is classified into an ATM transmitting cell processor 21 and an output resource processor 22. The ATM transmitting cell processor 21 performs a cell processing operation for transmitting the cell received from the function mode processor 40 to the physical layer function processor 50 of a corresponding port, and generates demultiplexing information. The output resource processor 22 interfaces the ATM cell with the physical layer function processor 50 using the demultiplexing information received from the ATM transmitting cell processor 21. The output resource processor 22 provides a function for ensuring access capability according to the size of a buffer demanded for an interface, adaptation to an operating speed of the physical layer function processor 50 and adaptability to an interface system (the output resource processor 22 selectively supports the RECEIVE TEADY system, and UTOPIA interface system proposed in ATM Forum) with the physical layer function processor 50. That is, the output resource processor 22 transmits the cell synchronized with an output interface signal 2-$c$ according to the interface system by the unit of 53 bytes to an input buffer of the physical layer function processor 50. The ATM transmitting cell processor 21 receives information about the cell of input service information from the processor interface 30 and records the information in the CAM to be used as standard information for retrieval. The output resource processor 22 receives information about point-to-point connection, point-to-multipoint connection and multicasting to be used as a cell routing operation.

The processor interface 30 is a function processor for providing an interface between hardware and a processor of the system control processing function part 60 achieved by software in a central processing unit. The processor interface 30 converts ATM connection information provided by a signal function of software to information necessary for an operation of the ATM layer function processing apparatus, such as a connection type for virtual path/virtual channel, conversion information, a routing port number, multiplexing priority, information about the load of a network, etc., and transmits the converted information to function portions for processing multiplexing and recording the cell information in the CAM. The state information of input and output buffers, and the ATM layer function processing apparatus is reported to the processor interface 30, and the processor interface 30 converts the state information to multiplexing/demultiplexing operation control information to control the ATM layer function processing apparatus.

In operation, if a chip select signal is asserted from the system control processing function part 60, an address decoder of the processor interface 30 interprets an address generated from a microprocessor to transmit a register select signal, a buffer select signal and a CAM select signal to a status and control register, a data buffer control logic circuit, and a CAM connection logic circuit, respectively. The status and control register of the processor interface 30 resets each buffer by writing processor data in a corresponding register in synchronization with the register select signal, or notifies the microprocessor that a corresponding buffer is full by transmitting a full flag thereto. The status and control register processor interface 30 provides control information of point-to-point routing, broadcasting, selective broadcasting, etc. according to field allocation of an output port identifier. The CAM connection logic circuit writes or reads control data for connection data, ATM header conversion and routing in or from the CAM in synchronization with the CAM select signal.

The function mode processor 40 receives a mode select signal 4-c from the processor interface 30 according to data generated from the system control processing function part 60, and provides an interface function so as to continuously (the intermediate node mode) or independently (the multiplexing node mode and the end node mode) use the ATM layer receiving and transmitting cell processors 10 and 20. That is, the function mode processor 40 directly connects the ATM layer receiving cell processor 10 to the ATM layer transmitting cell processor 20, or independently connects the ATM layer receiving and transmitting cell processors 10 and 20 to the physical layer function processor or the upper layer function processor.

If the mode select signal 4-c is the intermediate node mode, a point A is connected to a point B, and a signal 1-c is directly connected to a signal 2-a, as shown in FIG. 3A. Hence, the ATM layer receiving cell processor 10 is linked with the ATM layer transmitting cell processor 20. If the mode select signal 4-c is the multiplexing node mode, points A and C are connected to D and B, and signals 1-c and 4-a are directly connected to signals 4-b and 2-a, respectively, as shown in FIG. 3B. Hence, the ATM layer receiving cell processor 10 is linked with the physical layer function processor 50. If the mode select signal 4-c is the end node mode, points A and E are connected to F and B, and signals 1-c and 4-a are directly connected to signals 4-b and 2-a, respectively, as shown in FIG. 3C. Therefore, the ATM layer receiving cell processor 10 is linked with the upper layer function processor.

Figure 4:
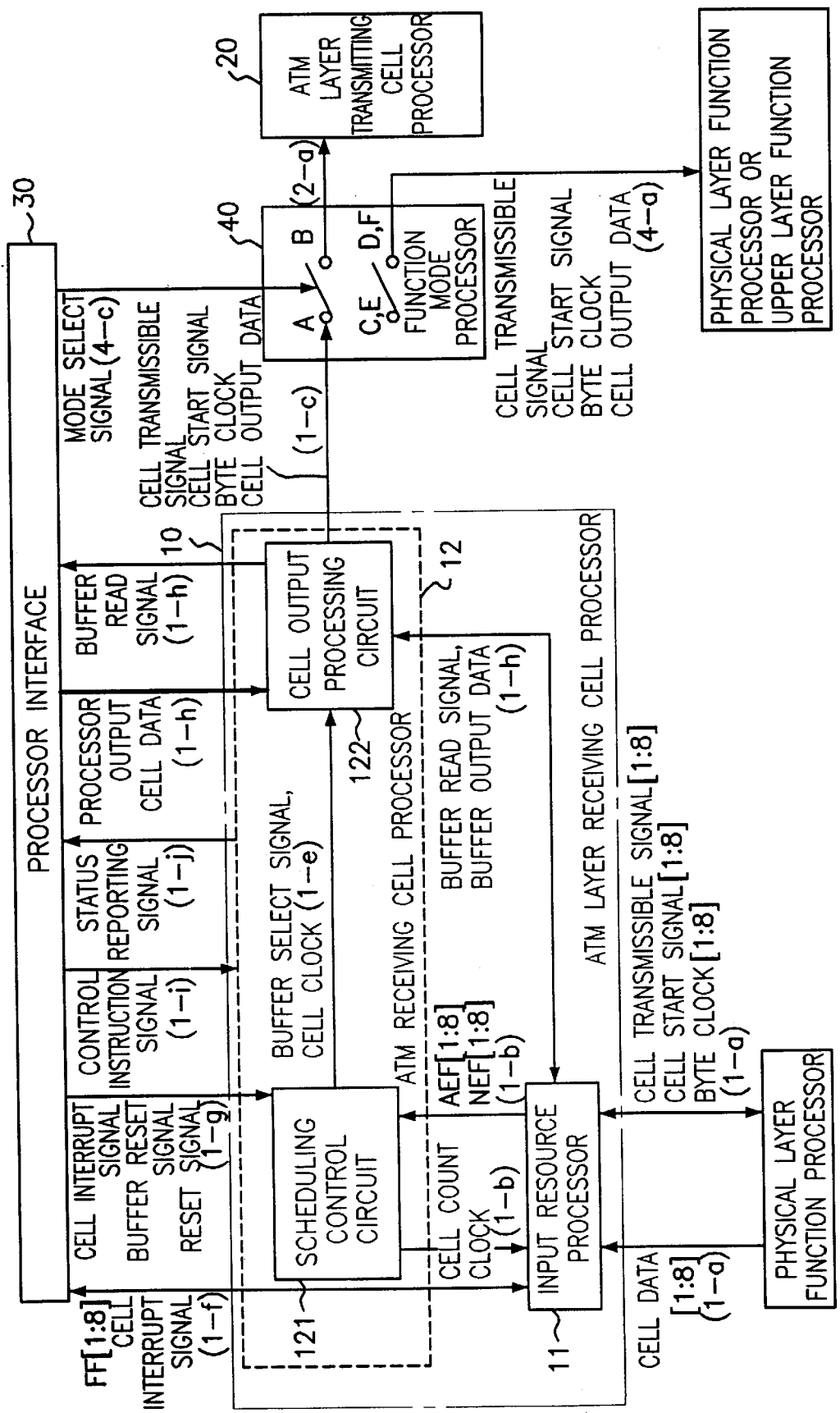
FIG. 4 is a block diagram illustrating an ATM layer receiving cell processor shown in FIG. 2.

Referring to FIG. 4, the ATM layer receiving cell processor 10 is an ATM cell multiplexer for multiplexing information received from the physical layer function processor 50 of a maximum of 8 ports and transmitting the multiplexed information to the function mode processor 40. The ATM layer receiving cell processor 10 ensures access capability according to the size of a buffer demanded for an interface with the physical layer function processor 50, adaptation to an operating speed and adaptability to an interface system, and provides a multiplexing operation according to the status information of a received buffer, priority information and a scheduling algorithm.

As shown in FIG. 4, the ATM layer receiving cell processor 10 is connected to the physical layer function processor 50 of a maximum of 8 ports, and has the input resource processor 11, a scheduling control circuit 121 and a cell output processing circuit 122. If a cell transmissible signal is received from a plurality of input ports of the subscriber physical layer function processor 50, the input resource processor 11 stores a cell start signal and cell input data extracted by use of a cell read clock in a buffer, and counts the number of received cells by a cell count clock to generate the status of the buffer. In addition, the input sources processor 11 generates a flag according to the number of received cells, and generates cell data by a buffer read signal. The scheduling control circuit 121 generates a buffer select signal which can select a buffer out of a plurality of buffers according to priority by a cell interrupt signal indicating that there is a signal and maintenance cell from the processor interface 30 and by the flag extracted from the input resource processor 11. The cell output processing circuit 122 controls the buffer in the input resource processor 11 and the processor interface 30 by the buffer read signal according to the buffer select signal generated from the scheduling control circuit 121, and receives buffer output data generated from one selected buffer and processor output cell data to insert a port identifier assigned as an unique value for each input port. Then, the cell output processing circuit 122 transmits the buffer output data and the processor output cell data to an output port in synchronization with a byte clock, a cell enable signal and a cell synchronization signal, constructs the signal and maintenance cell from the processor output cell data received from the processor interface 30 to store the signal and maintenance cell in the buffer, and constructs a control and status register to supply a status reporting signal to the processor interface 30.

In operation, each constituent operates by receiving a system clock. When operating together with the processor interface 30, each constituent operates by receiving a processor clock generated from the processor interface 30. The input resource processor 11 receives a cell synchronized with an interface signal (the cell transmissible signal, the cell start signal and the cell read clock) from a plurality of input ports (a maximum of 8 ports), stores the input cell in the buffer, extracts the flag, and transmits the flag to the scheduling control circuit 121. The scheduling control circuit 121 generates 9 buffer select signals which can select a buffer out of 9 buffers according to priority in synchronization with a cell clock by the cell interrupt signal indicating that there is the signal and maintenance cell from the processor interface 30 and by the input flag.

When 8 buffer select signals are received from the scheduling control circuit 121, the input resource processor 11 counts the number of cells in synchronized with the cell count clock generated from the scheduling control circuit 121, and judges whether the cell received from an input port is stored. The cell output processing circuit 122 controls the buffer in the input resource processor 11 and the process interface 30 by the buffer read signal according to the buffer select signal, receives the buffer output data generated from one selected buffer and the processor output cell data to insert the port identifier assigned as a unique value for each input port, and transmits the buffer output data and the processor output cell data to an output port in synchronization with the byte clock, the cell enable signal and the cell synchronizing signal. Further, the cell output processing circuit 122 constructs the signal and maintenance cell from the processor output cell data generated from the processor interface 30 to store the signal and maintenance cell in the buffer, constructs the control and status register, and interfaces with the processor interface 30 for reporting the status of the multiplexer to a microprocessor.

When the input resource processor 11 interfaces with the physical layer function processor 50, the RECEIVE READY system, PMC interface system proposed by PMC Sierra Co., and UTOPIA interface system proposed in ATM Forum etc. can be selectively constructed. In a preferred embodiment of the present invention, a description based on the PMC interface is given.

The input resource processor 11 includes an input cell receiving logic circuit, 8 buffers, a buffer write controller, a cell counter, and a cell number comparator. The input cell receiving logic circuit receives the cell start signal synchronized with the cell read clock by the cell transmissible signal indicating that there is cell input data from an input port, and notifies the cell counter that one cell is received. The 8 buffers store the cell input data. The buffer write controller writes 8 cell input data synchronized with the cell read clock in the buffer by the unit of a cell. The cell counter counts the number of cells in the buffer from 8 count increase signals generated from the cell receiving logic circuit, and the cell count clock and 8 buffer select signals generated from the scheduling control circuit 121. The cell number comparator extracts a flag from the number of cells generated from the cell counter.

In operation, if the cell transmissible signal indicating that there is one or more cell from 8 input ports is received, the input cell receiving logic circuit receives the cell start signal using the cell read clock. If one cell is completely received, the cell receiving logic circuit transmits the count increase signal to the cell counter. The buffer write controller receives the cell input data of 53 bytes synchronized with the cell read clock, and stores the cell input data in the buffer which has one per input port using the buffer write signal. If the cell number comparator informs the buffer write controller that the buffer is full, the buffer write controller prevents the cell input data 1-$a$ from being stored in the buffer.

If the count increase signal is received from the input cell logic circuit, the cell counter increases the number of counts, and if the buffer select signal 1-$e$ is received, the cell counter decreases the number of counts to determine the number of cells. The cell number comparator receiving the number of cells generates a flag NEF indicating that there is one or more cell in the buffer, a flag AFF indicating that the cell occupies ⅔ or more of the buffer capacity, and a flag FF indicating that the buffer is full. The flags NEF and AFF(1-$b$) are transmitted to the scheduling control circuit 121. The flag FF is transmitted to the buffer write controller of the input resource processor 11 and the processor interface 30.

The scheduling control circuit 121 includes a cell select and feedback logic circuit, a priority comparator, a fifty-ternary counter, a cell count signal generator, and a cell output synchronizing signal generator. The cell select and feedback logic circuit receives the cell interrupt signal generated from the processor interface 30 and 8 AFF flags and 8 NEF flags generated from the input resources processor 11, and generates 9 cell select signals according to priority. The priority comparator determines priority from the cell select signal generated from the cell select and feedback logic circuit, the cell interrupt signal and the flag. The fifty-ternary counter sequentially counts up to 53 in synchronization with the system clock. The cell count signal generator generates the cell count clock 1-$b$ which maintains logic "high" at a 30-th clock from the output of the fifty-ternary counter. The cell output synchronizing signal generator generates a cell clock which maintains logic "high" at a 53-th clock from the output of the fifty-ternary counter.

In operation, if the processor interface 30 requests an overall reset, the cell select and feedback logic circuit disables the buffer select signal and simultaneously becomes a standby state. If the processor interface 30 or the input resource processor 11 informs that there is a cell in the buffer through the cell interrupt signal or the flag, the priority comparator determines the priority from the buffer select signal, the cell interrupt signal and the flag and generates the cell select signal. The buffer which is being generated is known from an enabled signal out of 9 buffer select signals. The priority comparator allocates the priority to the signal and maintenance cell generated from the processor interface 30, and determines the first priority in order of a buffer generating the flag FF and a buffer generating the flag NEF.

To generate a clock used as a scheduling operation, the count output generated from the fifty-ternary counter consists of 6-bit parallel data and repeats a period of 53 bytes. Each time the count output generated from the fifty-ternary counter is 30, the cell count signal generator generates the cell count clock 1-$b$ of an impulse signal. The cell count clock of the cell count signal generator synchronizes the output of the cell counter of the input resource processor 11, that is, the number of cells with the system clock to fix the flag. The cell output synchronizing signal generator generates the cell clock of an impulse signal each time the count output of the fifty-ternary counter is 53. The cell clock of the cell output synchronizing signal generator operates the buffer select signal 1-$e$ to a period of 53 bytes, and synchronizes the cell synchronizing signal and the cell enable signal of the cell output processing circuit 122 to the unit of a cell of 53 bytes.

The cell output processing circuit 122 includes a buffer read controller for generating the buffer read signal 1-$h$ for one buffer enabled from the 9 buffer select signals, and a port identifier inserting logic circuit for inserting a port identifier into the processor output cell data and the buffer output data generated by the buffer read signal 1-$h$ of the buffer read controller and transmitting cell output data 1-$c$ of 53 bytes together with control signals (a byte clock, a cell enable signal and a cell synchronizing signal) to an output port.

In order to generate a cell of a buffer selected from the buffer select signal 1-$e$, the buffer read controller generates an output enable signal and a read enable signal enabled during 53 bytes in synchronization with a receiving clock RCLK, and the port identifier inserting logic circuit inserts the port identifier into 8 buffer output data generated from the buffer. The port identifier indicates a unique assigned value for each input port in order to distinguish 8 input ports. The port identifier is inserted into a GFC field or an HEC field of a cell header of 5 bytes. The port identifier inserting logic circuit inserts the port identifier into the buffer output data and simultaneously transmits the cell output data 1-$c$ to the output port.

Figure 5:
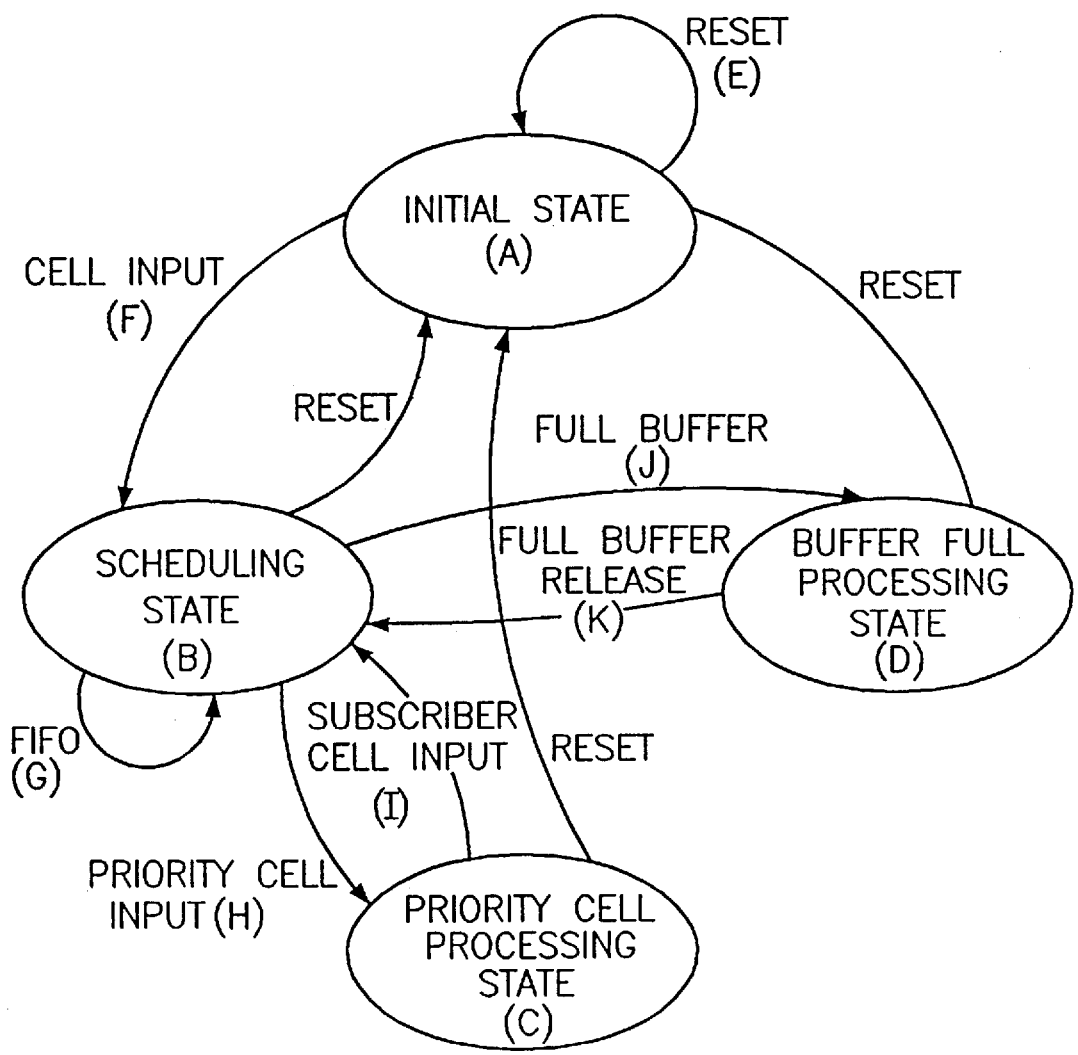
FIG. 5 shows a state transition diagram of an ATM layer receiving cell processor shown in FIG. 2.

FIG. 5 shows a state transition diagram of the ATM layer receiving cell processor 10. If a power source is ON or a reset signal is received (E), the ATM layer receiving cell processor 10 becomes an initial state (A). If a connection is set and an effective cell is received (F), the ATM layer receiving cell processor 10 is changed to a scheduling state (B) to read the cell from the input buffer by the unit of a cell of 8 bits according to the first-in first-out (FIFO) (G) principle for an input cell received from each port and store the cell in the output buffer. Cell information stored in the output buffer is transmitted to the next functional block when a transmission condition is satisfied. While reading the cell in each input buffer, if a cell ( a signal cell and an OAM cell) with high priority is received (H), the ATM layer receiving cell processor 10 is changed to a priority cell processing state (C). If there is no a priority cell (I), the ATM layer receiving cell processor 10 is again changed to the scheduling state (B) to read the cell from the input buffer and store the cell in the output buffer according to th FIFO principle. If there is a buffer generating the flag AFF (J), the ATM layer receiving cell processor 10 is changed to a buffer full processing state (D) to provide services to a corresponding buffer until the flag AFF is eliminated. If the flag AFF is eliminated (K), the ATM layer receiving cell processor 10 is again changed to the scheduling state (B) to continue to perform a multiplexing operation according to the FIFO principle. If overall reset is requested from the buffer full processing state (D), the ATM layer receiving cell processor 10 is again changed to the initial state (A).

Figure 6:
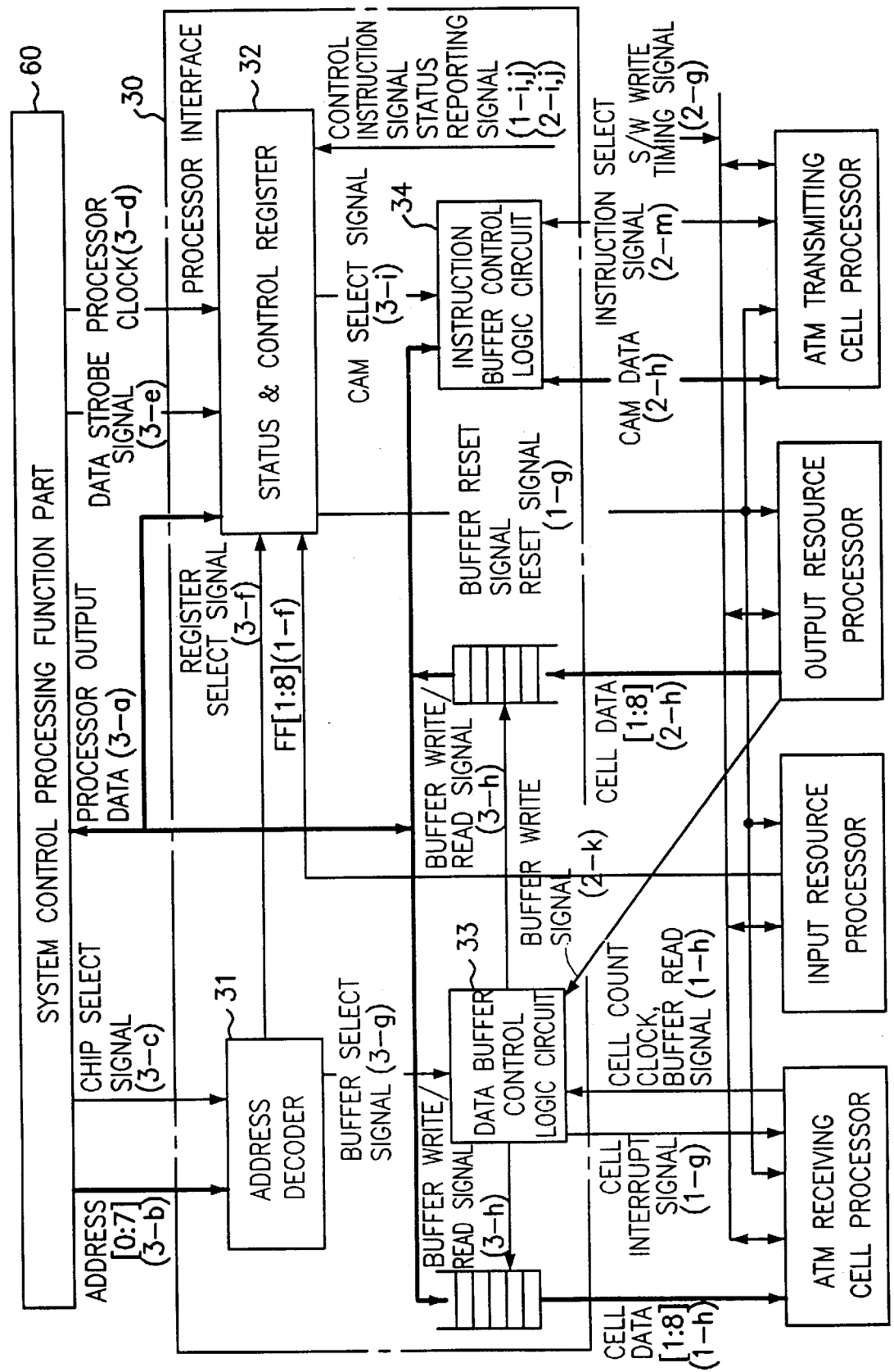
FIG. 6 is a block diagram of a processor interface shown in FIG. 2.

Referring to FIG. 6, the processor interface 30 includes an address decoder 31, a status and control register 32, a data buffer control logic circuit 33, and an instruction buffer control logic circuit 34. The address decoder 31 generates a register select signal 3-*f* for selecting a register and a buffer select signal 3-*g* by use of an 8-bit address 3-*b* and a chip select signal 3-*c* generated from the system control processing function part 60. The status and control register 32 supplies processor data to a corresponding register by using the register select signal 3-*f* generated from the address decoder 31, controls each constituent of the ATM layer function processing apparatus, and reports an operating state of the ATM layer function processing apparatus. Moreover, the status and control register 32 receives the flag FF generated from the input resource processor 11 to report whether each input buffer is full by a register value, receives control information about connection control, ATM header conversion and routing from the system control processing function part 60, and reports the display of a counted value of a discarded cell to the system control processing function part 60. The data buffer control logic 33 stores, in the buffer, the processor data from the buffer select signal 3-*g* generated from the address decoder 31, and informs the scheduling control circuit 121 of the ATM layer receiving cell processor 10 through a cell interrupt signal that the signal and maintenance cell arrives. The instruction buffer control logic circuit 34 temporarily stores connection information related to the conversion and routing in an internal instruction buffer by a connection control instruction generated from the system control processing function part 60, and controls the instruction buffer so as to record the connection information in the CAM by the control of the ATM layer transmitting cell processor 20.

In operation, if the chip select signal is received, the address decoder 31 receives the address 3-*b* and a data strobe signal 3-*e* indicating that the address is effective from the system control processing function part 60, and interprets the address to transmit the register select signal and the buffer select signal to the status and control register 32 and the data buffer control logic circuit 33, respectively. The status and control register 32 resets each buffer by writing the processor data in a corresponding register in synchronization with the register select signal 3-*f* generated from the address decoder 31, or notifies the system control processing function part 60 that a corresponding buffer is full by transmitting the flag FF thereto.

The data buffer control logic circuit 33 performs a writing operation according to a buffer write signal 3-*h* whenever the buffer select signal 3-*g* is asserted from the address decoder 31 and has a fifty-ternary counter therein. If the buffer select signal 3-*g* is asserted by 53 times, the data buffer control logic circuit 33 generates a buffer read signal 1-*h* and the cell interrupt signal 1-*g* to inform the scheduling control circuit 121 that there is signal and maintenance cell to be transmitted. If there is the signal and maintenance cell to be transmitted to the system control processing function part 60 from the output resource processor 22 of the ATM layer transmitting cell processor 20, and if a buffer write signal 2-*k* is generated, the data buffer control logic circuit 33 reads the cell from the buffer according to a buffer read signal 3-*h*.

A control register of the status and control register 32 receives control information about connection control, ATM header conversion and routing from the system control processing function part 60. A status register of the status and control register 32 shows an operating state of the ATM layer receiving cell processor 10 and the ATM layer transmitting cell processor 20 according to the control information of the control register, and has connection information which is not recorded in the CAM. Further, if the display of the discarded cell or the connection information recorded in the CAM is requested, the control register of the status and control register 32 transmits a status reporting signal 2-*j* to the system control processing part 60.

The instruction buffer control logic circuit 34 consists of the instruction buffer and an instruction control logic circuit. The instruction buffer temporarily stores the connection data, the CAM driving instruction code and the VPI/VCI conversion mapping value. The instruction buffer has a depth of 6 of the unit of 19 bits. The instruction control logic circuit temporarily stores the connection information related to the conversion and routing in the instruction buffer by the connection control instruction generated from the system control processing function part 60, and controls the instruction buffer so as to record the connection information in the CAM by the control of a CAM and controller of the ATM layer transmitting cell processor 20. As the connection information stored in the instruction buffer, there is an instruction select signal 2-*g* for driving the CAM, such as an address and a read/write signal, in addition to a GFC, a VPI/VCI mapping value and an output port identifier. If a software (S/W) write timing signal 2-*m* indicating that there is no search of the CAM for an incoming cell is received from the CAM and controller of the ATM layer transmitting cell processor 20, the instruction buffer transmits the connection information to the CAM and controller of the ATM layer transmitting cell processor 20. In this case, the instruction select signal 2-*g* is transmitted to the CAM and controller and used to drive the CAM.

Figure 7:
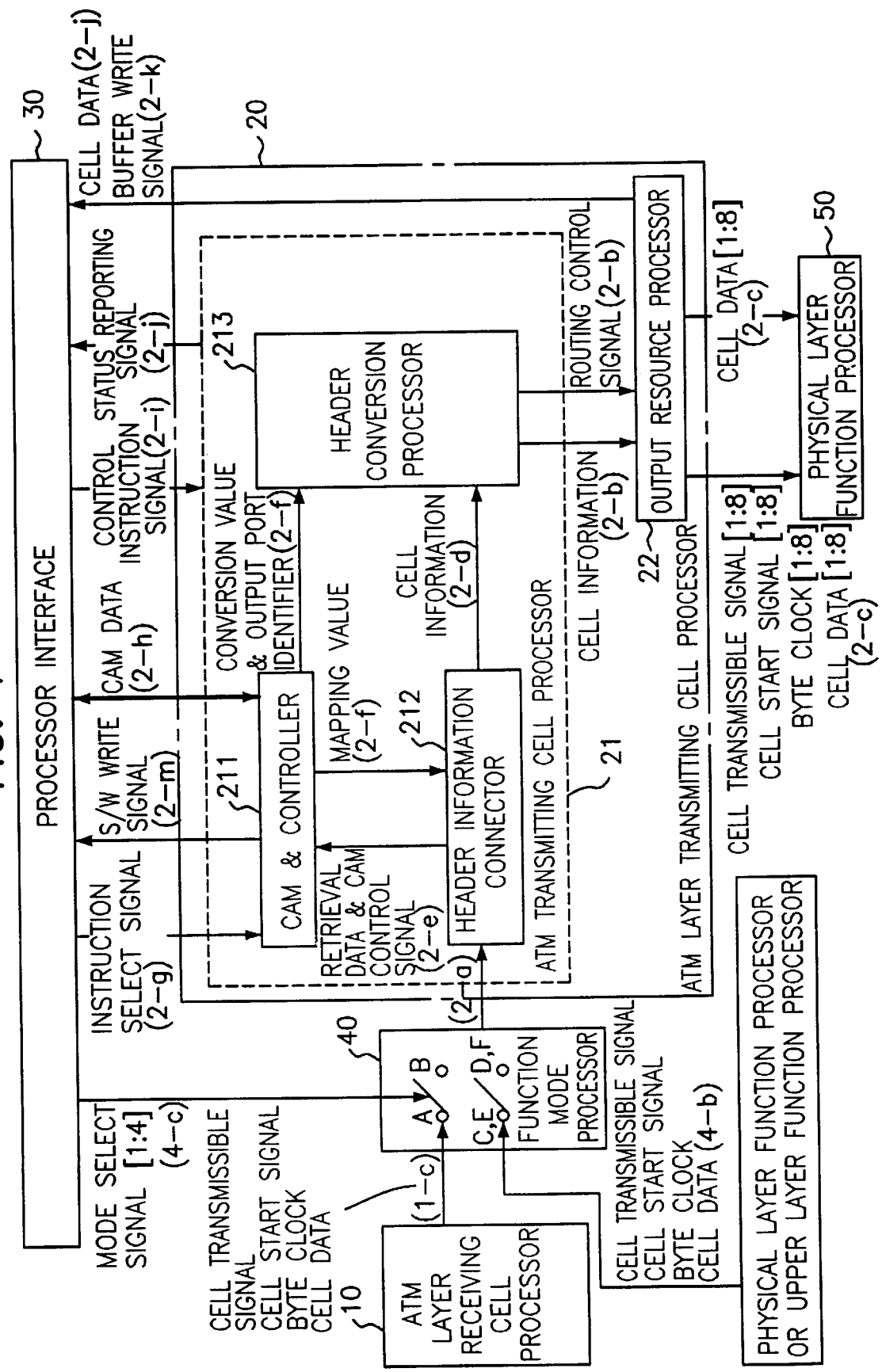
FIG. 7 is a block diagram of an ATM layer transmitting cell processor shown in FIG. 2.

Referring to FIG. 7, the ATM layer receiving cell processor 20 is an ATM cell demultiplexer for extracting header information from an ATM cell received from the function mode processor 40, and providing a demultiplexing operation using a routing port number through a CAM retrieving operation of the header information. The ATM layer cell processor 20 extracts data related to a converted VPI/VCI value, connecting setting, multicasting, etc. as well as the routing port number through the CAM retrieving operation, and provides a VPI/VCI converting function, a traffic monitoring function for a virtual channel and a virtual path, and a cell routing function for point-to-multipoint connection and multicasting. Further, the ATM layer transmitting cell processor 20 provides a function for ensuring the access capability according to the size of the buffer demanded for an interface, and the adaptability to an operating speed of the physical layer function processor 50.

The ATM layer transmitting cell processor 20 includes a CAM and controller 211, a header information connector 212, a header conversion processor 213, and the output resource processor 22. The CAM and controller 211 receives the instruction select signal 2-g and an instruction code 2-h from the instruction buffer of the processor interface 30, receives retrieval data and a CAM control signal 2-e to drive the CAM, and generates a match signal, a mapping value and an output port identifier. The header information connector 212 extracts a VPI/VCI within the cell header from effective arrival cell data 2-a generated from the function mode processor 40, and transmits the extracted VPI/VCI to the CAM and controller 211. Moreover, the header information connector 212 generates cell information so as to construct a new header according to the mapping value generated from the CAM and controller 211 or supplies an interrupt signal 2-j to the processor interface 30 while discarding an incoming cell and increasing the number of discarded cells by 1. The header conversion processor 213 stores a payload of an ATM layer, and reconstructs a header from the conversion value and the output port identifier generated from the CAM and controller 211 to header-convert the cell information 2-d generated from the header information connector 212. The header conversion processor 213 also interprets the output port identifier generated from the CAM and controller 211 to determine an output port, and generates a routing control signal 2-b and cell information 2-b including the converted header. The output resource processor 22 receives the output of the header conversion processor 213, and transmits cell data in synchronization with the cell transmissible signal, the cell start signal and the byte clock to the physical layer function processor 50.

In operation, the ATM connection information provided by a software signal function is recorded in the CAM and controller 211. If the ATM cell arrives from an input terminal by the cell synchronizing signal and the cell effective signal, the head information connector 212 extracts information related to the ATM cell, such as GFC, VPI/VCI, PTI, CLP, etc., from the header of the ATM cell.

If there is a corresponding connection of the connection information caused by the VPI/VCI by searching the CAM, a converted VPI/VCI value (mapping value) and the output port identifier value are read from the CAM, and transmitted to the header conversion processor 213 to reconstruct a new header. The output port identifier value and a PTI field (to distinguish the F5 OAM cell) contained in the header of the input cell are simultaneously interpreted to determine a corresponding port. The output resource processor 22 transmits the cell to a corresponding port. If there is no a corresponding connection, the cell is discarded and a count value of a non-connection cell counter increases by 1 to transmit the interrupt signal to the processor interface 30 by driving software. The driving software senses the interrupt signal to read the value of the non-connection cell counter, and the counter is reset to wait an arrival of the next non-connection cell. If a search for the CAM by the extracted VPI/VCI is over, or the effective ATM cell does not arrive, whether there are connection recording and erasing instructions is confirmed. If there is an instruction control signal 2-g, the instruction code 2-h is recorded in the CAM, and if not, the next cell is waited. The instruction code 2-h includes a code for driving the CAM, the VPI/VCI to be connected, and the VPI/VCI to be converted, and the output port identifier.

The CAM and controller 211 includes the CAM for storing the connection setting information and a CAM controller for controlling an information writing operation.

If the S/W write timing signal 2-m indicating that there is no search of the CAM for an incoming cell is received from the CAM and controller 211, the connection information 2-h stored in the instruction buffer control logic circuit 34 of the processor interface 30 is transmitted to the CAM and controller 211. In this case, the instruction select signal 2-g which is the read/write control signal is transmitted to the CAM and controller 211 to be used to drive the CAM.

The header conversion processor 213 performs the header conversion by overwriting the conversion value in header timing of a one-cell time according to the match signal and conversion information generated from the CAM. Since a value for the overall cell header of 4 bytes including the PTI, CLP and GFC fields as well as the VPI/VCI field can be replaced, congestion control, operation and management, usage parameter control, and ATM layer functions are effectively implemented. Moreover, an application to not only an ATM protocol but other protocols for address conversion is possible. Since the output resource processor 22 implements cell routing to the physical layer function processor or the processor interface to which the input cell should be transmitted according to the match signal and the output port identifier 2-f, the broadcasting and the selective broadcasting are possible according to the field allocation of the proper output port identifier.

The CAM and controller 211 mainly generates a control signal for controlling the CAM. The CAM and controller 211 receives the instruction select signal 2-g and the instruction code 2-h from the instruction buffer of the processor interface 30, and receives the retrieval data 2-e and the CAM control signal 2-e from the header information connector 212. The CAM and controller 211 multiplexes the instruction select signal 2-g, the instruction code 2-h, the retrieval data 2-e and the CAM control signal to drive the CAM. When the CAM is driven by these signals and data, if a connection is recorded, the match signal, the mapping value and the output port identifier are generated as a form of the CAM data 2-f, and if the connection is not recorded, the match signal 2-f is generated.

The header information connector 212 consists of 5 shift registers each having 8 bits, and performs operations for extracting the header, processing the header information and generating the CAM control signal and the retrieval data 2-e. The header information connector 212 extracts the VPI/VCI within the cell header from the effective arrival cell data 2-a continuously generated from the function mode processor 40, and transmits the extracted VPI/VCI to the CAM and controller 211. The header information connector 212 receives the mapping value MF* (2-f) which is a signal of a result of searching the CAM in the CAM and controller 211 by the extracted VPI/VCI. If the mapping value MF* is 0, the header information connector 212 transmits the mapping value to the header conversion processor 213 so as to construct a new header. If the mapping value MF* is 1, the header information connector 212 discards the incoming cell, increases the number of the discarded cells by 1, and transmits the interrupt signal 2-j to the processor interface 30.

The header information connector 212 distinguishes a type of the 5 OAM cell from the PTI field value extracted from the header extracting operation and supplies data 2-d to the header conversion processor 213. Furthermore, the header information connector 212 generates the retrieval data and the control signal 2-e from the cell effective signal, the cell synchronizing signal and the byte clock received from the function mode processor 40 to be transmitted to the CAM and controller 211.

The header conversion processor 213 consists of a cell buffer, an 8-bit multiplexer and a header conversion control logic circuit. The cell buffer stores the payload of the ATM layer of 49 bytes while referring the VPI/VCI extracted from the cell header from the CAM. The header conversion control logic circuit reconstructs the header from the conversion value and the output port identifier 2-f generated from the CAM and controller 211, and transmits the cell information 2-d stored in the cell buffer by use of the multiplexer to perform overwriting. The header conversion control logic circuit interprets the output port identifier generated from the CAM and controller 211 to determine the output port and to generate the routing control signal 2-b. The routing control signal 2-b is stored in a corresponding output buffer of the output resource processor 22 together with the cell information 2-b including the converted header.

Figure 8:
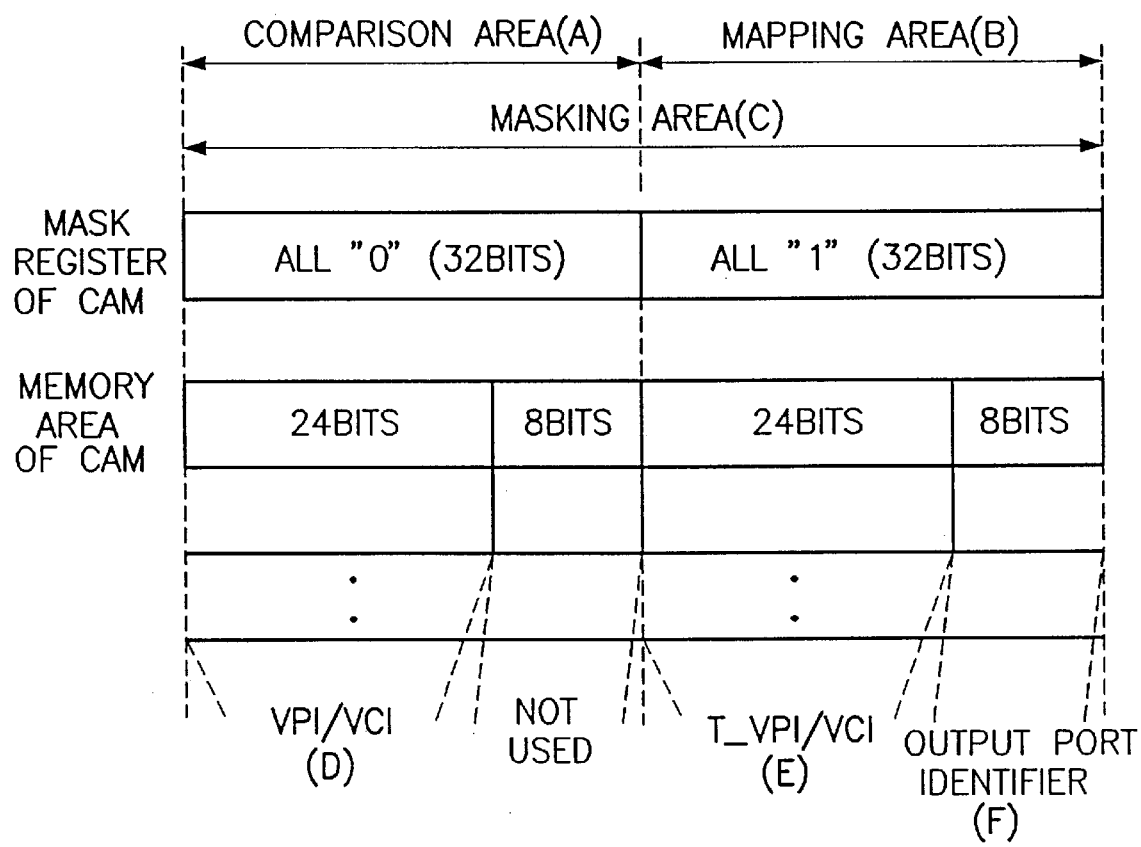
FIG. 8 illustrates a structure of a content addressable memory of the ATM layer transmitting cell processor shown in FIG. 2.

FIG. 8 illustrates the structure of the CAM in the ATM layer transmitting cell processor 20. The CAM is a chip which is mainly used in LAN (local area network) and controlled by the unit of 16 bits, and has a width of 64 bits. The input cell connection information (VPI/VCI) is stored in a comparison area (A) of 32 bits, a mapping value (E) for VPI/VCI conversion and an output port identifier (F) are stored in a mapping area (B) of 32 bits. The field control of the unit of 16 bits is determined during initialization. The comparison area (A) can mask a search field by a mask register of the CAM. A VPI/VCI (D) is the connection information contained in header of the input cell, and T_VPI/VCI (E) indicates the mapping value for the conversion of the VPI/VCI.

Figure 9:
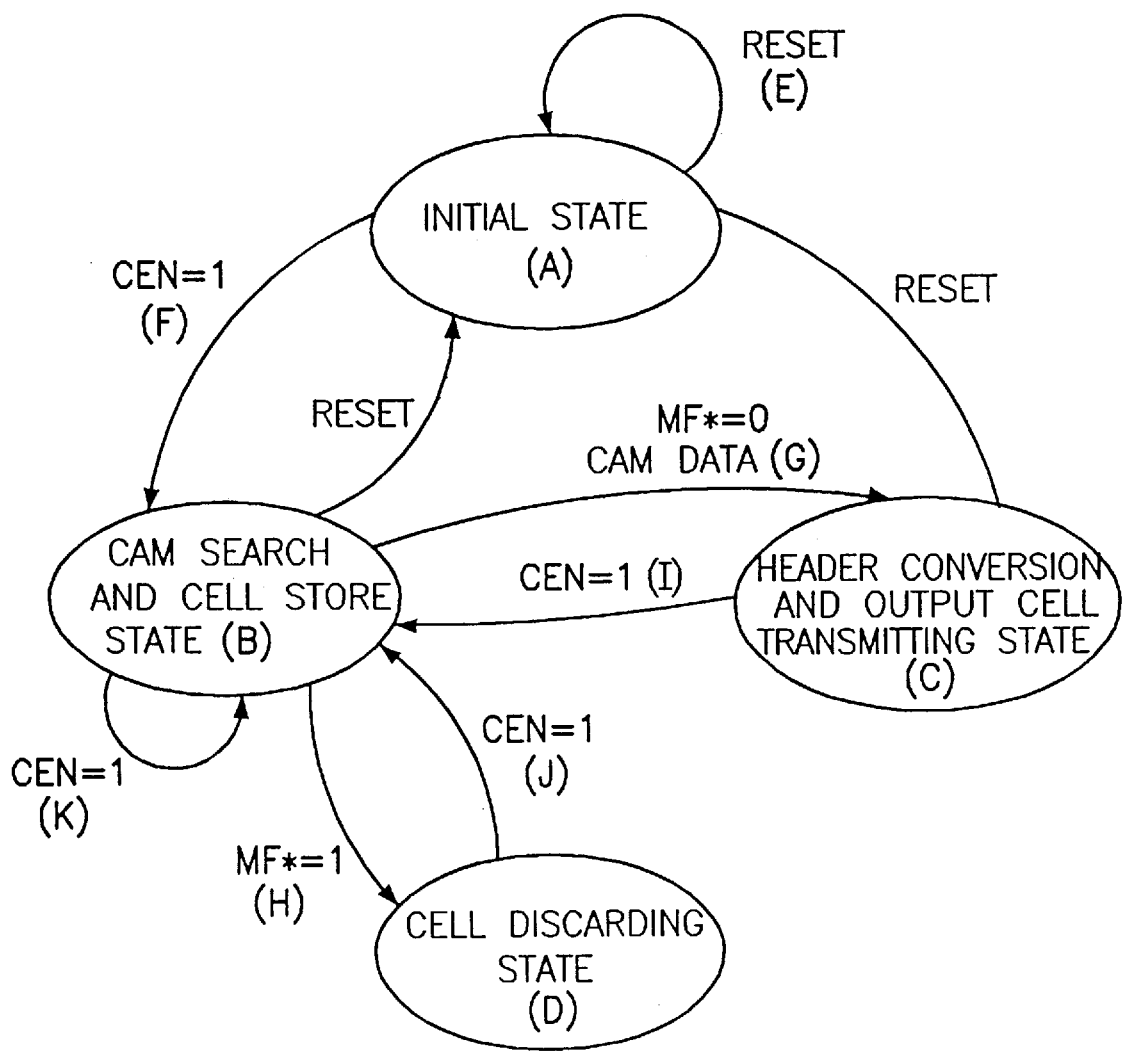
FIG. 9 is a state transition diagram of the ATM layer transmitting cell processor shown in FIG. 2.

FIG. 9 shows a state transition diagram of the ATM layer transmitting cell processor 20. If a power source is turned on, or a reset signal (E) is received, the ATM layer transmitting cell processor 20 is initialized (A). If an effective cell (F) is received, the ATM layer transmitting cell processor 20 is changed to a CAM search and cell store state (B) to store the cell during the search of the CAM. If the CAM data, that is, the mapping value and the output port identifier, is transmitted (G) from the CAM and controller 211, the new header is constructed from the mapping value and the CAM search and cell store state (B) is maintained until the next cell is transmitted. If the CAM data is received (G), the ATM layer transmitting cell processor 20 reads the cell data stored in the cell buffer and simultaneously generates the new header of 4 bytes. The ATM layer transmitting cell processor 20 overwrites the header by controlling the 8-bit multiplexer and transmits the 49-byte pay load. The ATM layer transmitting cell processor 20 is changed to a header conversion and output cell transmitting state (C) to transmit the cell having the converted header. The transmitted data is stored in the output buffer selected by the output port identifier.

The cell information having the converted header is transmitted to the next transmission block when a transmission condition is satisfied. If there is no a recorded connection, that is, if the mapping value MF* is 1 (H), the cell is regarded as a wrong cell, and the ATM layer transmitting cell processor 20 is changed to a cell discarding state (D). Under the header conversion and output cell transmitting state (C) and the cell discarding state (D), if the next cell data arrives (I and J), the ATM layer transmitting cell processor 20 is changed to the CAM search and cell store state (B).

As described above, necessary information is extracted from the virtual channel/virtual path by the unit of a cell, and the ATM protocol is processed using this information. A function and a structure can be enlarged by a physical connection according to a position and a function attained scale of the system. There is provided a header information processing function of the cell received from the ATM layer, such as the CAM management for the CAM, ATM connection setting/release, VPI/VCI conversion, cell routing, distinction of the F4 and F5 OAM cells, internal call processing, traffic monitoring, etc. The band width necessary for the connection supplied from lines is efficiently provided, and the high-speed multiplexing function is given. The physical layer and the ATM layer are connected according to the stand irrespective of a type of a physical medium and a line speed. An ATM link management function is improved and easily enlarged. The ATM layer function processing apparatus is operates as three functional modes using a moduled concept so ass to commonly used in nay systems of the B-ISDN. That is, the ATM layer function processing apparatus is used in a broadband network terminator (B-NT), an access node (AN), etc. corresponding to an intermediate node of the B-ISDN to provide the protocol processing function and the routing function of the ATM layer, and used in a multiplexer, a concentrator, etc. to provide the multiplexing/demultiplexing operation and the concentrating function. Moreover, the ATM layer function processing apparatus is used in a broadband terminal adaptor (B-TA), broadband terminal equipment (B-TE), etc. corresponding to subscriber terminating systems of the B-ISDN to provide an ATM layer function for accessing a network in an ATM layer protocol. Therefore, the ATM layer function processing apparatus can be used in the cell routing operation for point-to-multipoint connection and multicasting as well as point-to-point connection.

What is claimed is:

1. An asynchronous transfer mode (ATM) layer function processing apparatus with an enlarged structure, comprising:

ATM layer receiving cell processing means for storing a cell start signal and cell input data extracted by use of a cell read clock in a buffer when a cell transmissible signal is received from an input signal of a subscriber physical layer function processor, extracting a flag according to the number of stored cells, and performing a multiplexing operation according to a scheduling algorithm using a cell interrupt signal and the extracted flag;

processor interface means for forming a cell from data received from a microprocessor, storing said cell in a buffer, generating said cell interrupt signal, and controlling each constituent of said ATM layer function processing apparatus;

ATM layer transmitting cell processing means for performing an input cell routing function according to an output port identifier value when a corresponding routing value and a match signal are generated from a connection table, and performing output cell routing, broadcasting and selective broadcasting functions according to the field allocation of an appropriate output port identifier value; and function mode processing means connected between said ATM layer receiving cell processing means and said ATM layer transmitting cell processing means, for independently connecting said ATM layer receiving cell processing means and said ATM layer transmitting cell processing means to network and subscriber physical layer function processors connected to each physical link according to a control signal of said processor interface means.

2. An asynchronous transfer mode (ATM) layer function processing apparatus with an enlarged structure as claimed in claim 1, wherein said ATM layer receiving cell processing means comprises:

input resource processing means for storing a cell start signal and cell input data extracted by use of a cell read clock in a buffer when a cell transmissible signal is received from a plurality of input ports of said subscriber physical layer function processor, counting the number of received cells by a cell count clock to generate the status of a buffer, extracting a flag according to the number of stored cells, and generating cell data by a buffer read signal;

scheduling control means for generating a plurality of buffer select signals which can select a buffer out of a plurality of buffers according to priority by a cell interrupt signal indicating that there is a signal and maintenance cell from said processor interface means and by the flag extracted from said input resource processing means; and cell output processing means for controlling buffers included in said input resource processing means and said processor interface means by said buffer read signal according to said buffer select signal generated from said scheduling control means, receiving buffer output data generated from one selected buffer and processor output cell data to insert a port identifier assigned as an unique value for each input port, transmitting said buffer output data and said processor output cell data to an output port in synchronization with a byte clock, a cell enable signal and a cell synchronizing signal, constructing said signal and maintenance cell from said processor output cell data generated from said processor interface means to store said signal and maintenance cell in the buffer, and constructing a control and status register to supply a status reporting signal to said processor interface means.

3. An asynchronous transfer mode (ATM) layer function processing apparatus with an enlarged structure as claimed in claim 2, wherein said input resource processing means comprises:

input cell receiving logic means for receiving said cell start signal synchronized with said cell read clock by said cell transmissible signal indicating the there is cell input data from an input port, and notifying a cell counter that one cell is received;

a plurality of buffering means for storing said cell input data;

buffer write control means for writing said cell input data synchronized with said cell read clock in said plurality of buffering means by the unit of a cell;

cell counting means for counting the number of cells in the buffer from a count increase signal generated from said input cell receiving logic means, and said cell count clock and said buffer select signal generated from said scheduling control means; and cell number comparing means for receiving the number of cells generated from said cell counting means and extracting a flag.

4. An asynchronous transfer mode (ATM) layer function processing apparatus with an enlarged structure as claimed in claim 2, wherein said scheduling control means comprises:

cell select and feedback logic means for receiving said cell interrupt signal generated from said processor interface means and flags generated from said input resources processing eans, and generating cell select signals according to priority;

priority comparing means for determining the priority from said cell select signals generated from said cell select and feedback logic means, said cell interrupt signal and said flags;

fifty-ternary counting means for sequentially counting up to 53 in synchronization with a system clock;

cell count signal generating means for generating a cell count clock which maintains logic "high" at a 30-th clock from the output of said fifty-ternary counting means; and cell output synchronizing signal generating means for generating a cell clock which maintains logic "high" at a 53-th clock from the output of said fifty-ternary counting means.

5. An asynchronous transfer mode (ATM) layer function processing apparatus with an enlarged structure as claimed in claim 2, wherein said cell output processing means comprises:

buffer read control means for generating said buffer read signal for one buffer enabled from said plurality of buffer select signals generated from said scheduling control means; and port identifier inserting logic means for inserting a port identifier into said processor output cell data and said buffer output data generated by said buffer read signal of said buffer read control means, and transmitting cell output data of 53 bytes together with a byte clock, a cell enable signal and a cell synchronizing signal to an output port.

6. An asynchronous transfer mode (ATM) layer function processing apparatus with an enlarged structure as claimed in claim 1, wherein said processor interface means comprises:

address decoding means for generating a register select signal and a buffer select signal by use of an 8-bit address and a chip select signal generated from system control processing function means;

status and control register means for supplying processor data to a corresponding register by use of said register select signal generated from said address decoding means, controlling each constituent of said ATM layer function processing apparatus, reporting an operating state of said ATM layer function processing apparatus, reporting whether each input buffer is full by a register value, receiving control information about connection control, ATM header conversion and routing from said system control processing function means, and reporting the display of a counted value of a discarded cell to said system control processing function means;

data buffer control logic means for storing, in a buffer, said processor data from said buffer select signal generated from said address decoder, and informing scheduling control means of said ATM layer receiving cell processing means through a cell interrupt signal that a signal and maintenance cell arrives; and instruction buffer control logic means for temporarily storing connection information by a connection control instruction from said system control processing function means in an instruction buffer in which connection control data, a connection table driving instruction code and a mapping value are stored, and controlling said instruction buffer so as to be recorded in said connection table by the control of said ATM layer transmitting cell processing means.

7. An asynchronous transfer mode (ATM) layer function processing apparatus with an enlarged structure as claimed in claim 1, wherein said ATM layer transmitting cell processing means comprises:

connection table and control means for receiving an instruction select signal and an instruction code from an instruction buffer of said processor interface means, receiving retrieval data and a connection table control signal, and generating a conversion value, a mapping value and an output port identifier by driving a connection table;

header information connecting means for extracting a virtual path identifier/virtual channel identifier (VPI/VCI) within a cell header from effective arrival cell data generated from said function mode processing means, transmitting the extracted VPI/VCI to said connection table and control means, and generating cell information so as to construct a new header according to said mapping value generated from said connection table and control means or supplying an interrupt signal to said processor interface means while discarding an incoming cell and increasing the number of discarded cells by 1;

header conversion processing means for storing a payload of an ATM layer, reconstructing a header from said conversion value and said output port identifier generated from said connection table and control means to header-convert said cell information generated from said header information connecting means, interpreting said output port identifier generated from said connection table and control means to determine an output port, and generating a routing control signal and cell information including the converted header; and output resource processing means for receiving the output of said header conversion processing means, and transmitting cell data in synchronization with said cell transmissible signal, said cell start signal and said byte clock to a corresponding physical layer function processor.

* * * * *